United States Patent [19]

Small

[11] 3,999,738
[45] Dec. 28, 1976

[54] CHAIN TOOL
[76] Inventor: Fred Edward Small, Root Road, Westfield, Mass. 01085
[22] Filed: Feb. 9, 1976
[21] Appl. No.: 656,100
[52] U.S. Cl. .............................................. 254/67
[51] Int. Cl.² ........................................ B66F 3/08
[58] Field of Search ................ 254/67, 54, 100; 269/241, 239; 29/268, 256, 221

[56] References Cited
UNITED STATES PATENTS

| | | | |
|---|---|---|---|
| 240,217 | 4/1881 | Allen | 269/243 |
| 3,901,476 | 8/1975 | Giampaglia | 254/67 |

Primary Examiner—Al Lawrence Smith
Assistant Examiner—Robert C. Watson
Attorney, Agent, or Firm—Ross, Ross & Flavin

[57] ABSTRACT

A tool comprising a pair of pivoted jaws for engaging the ends of a chain for pulling the chain ends toward each other for link repair or replacement, and a spring-loaded adjustment bolt extending through offset portions of the jaws and having a thumb nut threaded thereon for adjusting the position of the jaws.

3 Claims, 8 Drawing Figures

CHAIN TOOL

A primary object of the invention is to provide a simple, inexpensive tool which will greatly facilitate chain repair.

Another object is to provide a tool of the type described which is readily adjustable for use with a wide variety of chain sizes.

Figure 1:
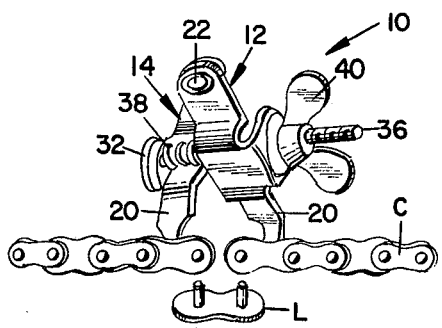
FIG. 1 is a perspective view of showing the manner of use of the tool of the invention.
Figure 2:
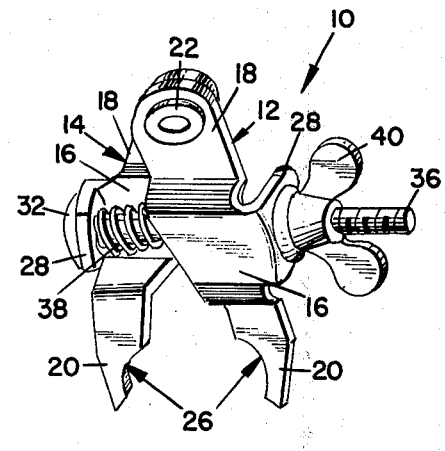
FIG. 2 is a front perspective view of the tool.
Figure 3:
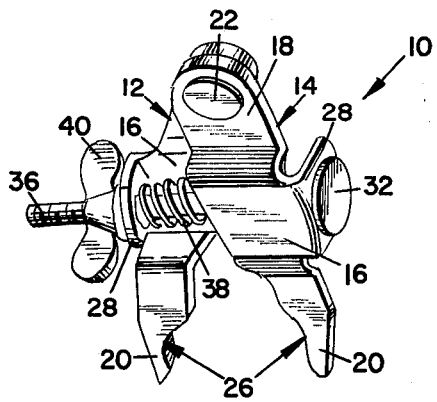
FIG. 3 is a rear perspective view of the tool.

The tool of the invention is generally indicated by 10 and is used in the manner shown in FIG. 1 for repairing or replacing links L of a chain C.

The tool includes a pair of jaws generally indicated by 12 and 14, each the mirror image of the other and including a main body portion 16 located approximately centrally of the length of the jaw, a pivot portion 18 extending outwardly from one end of the main body portion, and a gripper portion 20 extending outwardly from the other end of the main body portion.

The pivot portion 18 and gripper portion 20 are each offset relative to the plane of the main body portion in manner such that when the pivot portions of a pair of jaws are brought into face-to-face relation the gripper portions are aligned as to each other.

The jaws are pivotally connected by a pivot pin 22 which passes through aligned openings 24 in the pivot portions 18.

The gripper portions 20 are fingerlike in configuration and are suitably concaved along one edge as at 26 for gripping the rollers, not shown, of chain C, when the gripper portions are inserted between the links L of the chains as shown in FIG. 1.

Main body portion 16 of each jaw is provided, along one edge thereof, with a curved, offset bolt retainer 28 which has a rectangular opening 30 therein, the bolt retainer being perpendicular to the plane of the main body portion.

Figure 8:
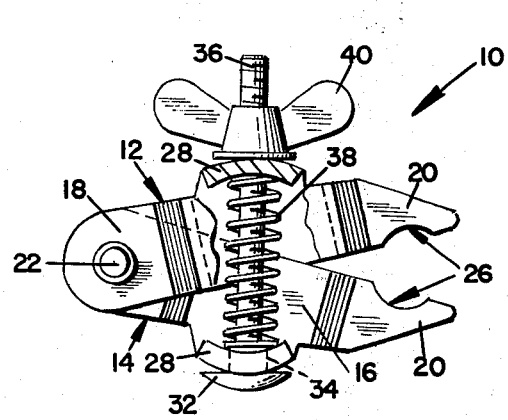
FIG. 8 is a front elevational view of the tool with portions broken away for clarity.

The jaws are assembled so that bolt retainers 28 face each other. When so assembled, a carriage bolt 32 is extended through the openings 30, with a shoulder 34, thereof, (see FIG. 8), fitting in one of the openings so as to preclude rotation of the bolt, and the threaded shank 36 of the bolt passing freely through the other opening 30. The rectangular shape of the openings 30 precludes rotation of the bolt while permitting free sliding movement of the jaws relative thereto without binding.

A coil spring 38 is sleeved on threaded shank 36 of the bolt and abuts the inner face of each bolt retainer 28, the spring serving to urge the gripper portions 20 of the jaws to swing outwardly away from each other.

A thumb nut 40 is threaded on shank 36 and is adapted to bear against the outer face of one of the bolt retainers 28.

When the thumb nut is tightened, it causes the gripper portions 20 of the jaws to pivot inwardly toward each other against the force of the spring 38, thereby to firmly grip the ends of the chain in which the gripper portions are inserted to draw the ends of the chain toward each other, for facilitating the repair of removal of a link.

When the thumb nut is loosened, the gripper portions of the jaws are urged apart by spring 38 to release the ends of the chain.

Figure 4:
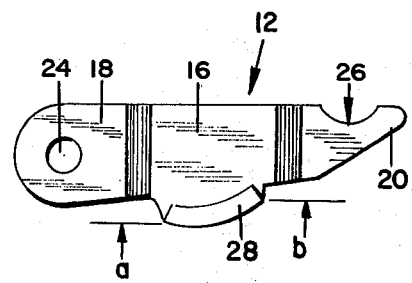
FIG. 4 is a front elevation view of one of the tool jaws.
Figure 5:
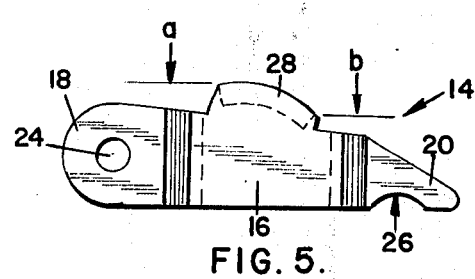
FIG. 5 is a rear elevational view of one of the tool jaws.
Figure 6:
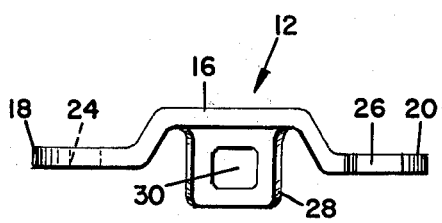
FIG. 6 is a top plan view of the tool jaw of FIG. 4.
Figure 7:
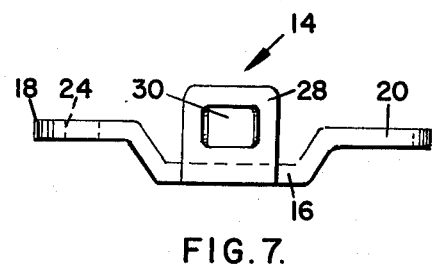
FIG. 7 is a top plan view of the tool jaw of FIG. 5.

It will be observed that the bolt retainers are so disposed relative to the side edge of the main body portion of each jaw that one end of the retainer extends outwardly from the edge of the main body portion a greater distance than the other end, the larger dimension being indicated by a and the smaller dimension by b on FIGS. 4 and 5. Such dimensioning allows for greater range of movement of the bolt and freer functioning of the jaws.

The curved configuration of the bolt retainers also allows greater range of movement of the jaws.

I claim:

1. A chain tool to facilitate removing or replacing the links of a chain comprising, a pair of jaws each the mirror image of the other and including a main body portion, a pivot portion and a gripper portion, the pivot portion and gripper portion being offset relative to the plane of the main body portion whereby when the pivot portions are brought into face-to-face contact the gripper portions are aligned so as to be engageable with the chain links, a bolt retainer extending outwardly from the main body portion, means pivotally connecting the pivot portions of the jaws when the pivot portions are in face-to-face relation with the bolt retainers facing in opposite directions, adjustment means for adjusting the position of the jaw comprising a bolt extending through the bolt retainers and having a shoulder fitted in one of the retainers for precluding bolt rotation, a nut threaded on the bolt and adapted to bear on the other of the retainers whereby rotation of the nut effects pivoting movement of the jaws relative to each other.

2. A chain tool according to claim 1, including a spring sleeved on the bolt and disposed between the oppositely-facing bolt retainers.

3. A chain tool according to claim 1, wherein the bolt retainer is curved and extends outwardly from an edge of the main body portion, with one side edge of the bolt retainer being spaced a greater distance from the main body portion than the other side edge of the bolt retainer.

* * * * *